(12) United States Patent
Sanders

(10) Patent No.: US 10,022,678 B2
(45) Date of Patent: *Jul. 17, 2018

(54) VENTING ASSEMBLY AND MICROPOROUS MEMBRANE COMPOSITE

(71) Applicant: Donaldson Company, Inc., Minneapolis, MN (US)

(72) Inventor: Jacob Sanders, Burnsville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 55 days.

This patent is subject to a terminal disclaimer.

(21) Appl. No.: 15/130,031

(22) Filed: Apr. 15, 2016

(65) Prior Publication Data

US 2016/0228827 A1 Aug. 11, 2016

Related U.S. Application Data

(63) Continuation of application No. 13/839,046, filed on Mar. 15, 2013, now Pat. No. 9,317,068.

(60) Provisional application No. 61/705,090, filed on Sep. 24, 2012.

(51) Int. Cl.
*B01D 53/22* (2006.01)
*B01D 39/16* (2006.01)
(Continued)

(52) U.S. Cl.
CPC ......... *B01D 71/36* (2013.01); *B01D 39/1692* (2013.01); *B01D 53/228* (2013.01);
(Continued)

(58) Field of Classification Search
CPC ........ B01D 53/22; B01D 39/16; B01D 71/36; G06F 1/16; H04R 1/28; H04R 1/02; H04R 1/08
(Continued)

(56) References Cited

U.S. PATENT DOCUMENTS 2,764,602 A 9/1956 Ahlbrecht et al.
2,764,603 A 9/1956 Ahlbrecht et al.
(Continued)

FOREIGN PATENT DOCUMENTS

EP 2493216 8/2012
JP 10165787 6/1998
(Continued)

OTHER PUBLICATIONS

"First Office Action," for Chinese Patent Application No. 201380057195.7 dated Mar. 3, 2016 (22 pages) with English Translation.
"Second Office Action," Chinese Patent Application No. 201380057195.7 dated Oct. 10, 2016 (23 pages) with English Translation.
(Continued)

*Primary Examiner* — Robert A Hopkins
*Assistant Examiner* — Minh-Chau Pham
(74) *Attorney, Agent, or Firm* — Pauly, DeVries Smith & Deffner LLC

(57) ABSTRACT

The technology encompassed by the current disclosure generally relates to membrane composites that can be used in acoustic venting assemblies. In one embodiment of the technology disclosed herein, a venting media composite has a microporous membrane layer and a coating on the microporous membrane layer to form a composite. The basis weight of the composite is at least about 0.5% higher than a basis weight of the microporous membrane layer without the coating. In some embodiments the composite has a decreased insertion loss than its membrane-only counterpart.

20 Claims, 15 Drawing Sheets

(51) Int. Cl.
*B01D 71/36* (2006.01)
*G06F 1/16* (2006.01)
*H04R 1/28* (2006.01)
*H04R 1/02* (2006.01)
*H04R 1/06* (2006.01)
*H04R 1/08* (2006.01)
*B01D 67/00* (2006.01)
*B01D 69/12* (2006.01)

(52) U.S. Cl.
CPC ......... *B01D 67/0095* (2013.01); *B01D 69/12* (2013.01); *G06F 1/1656* (2013.01); *H04R 1/023* (2013.01); *H04R 1/086* (2013.01); *H04R 1/28* (2013.01); *B01D 2275/30* (2013.01); *B01D 2279/35* (2013.01); *B01D 2323/30* (2013.01); *B01D 2325/02* (2013.01); *B01D 2325/20* (2013.01); *B01D 2325/24* (2013.01); *H04R 2499/11* (2013.01)

(58) Field of Classification Search
USPC ........... 55/385.4, 385.6, 486; 96/9; 381/355, 381/486; 428/36.5; 156/222, 278; 73/31.05; 95/285
See application file for complete search history.

(56) References Cited

U.S. PATENT DOCUMENTS

| | | | |
|---|---|---|---|
| 2,803,656 | A | 8/1957 | Ahlbrecht et al. |
| 3,147,064 | A | 9/1964 | Brown et al. |
| 3,255,131 | A | 6/1966 | Ahlbrecht et al. |
| 3,450,755 | A | 6/1969 | Ahlbrecht et al. |
| 4,042,522 | A | 8/1977 | Falk |
| 4,069,158 | A | 1/1978 | Bertocchio et al. |
| 4,069,244 | A | 1/1978 | Mueller |
| 4,090,967 | A | 5/1978 | Falk |
| 4,161,590 | A | 7/1979 | Mueller |
| 4,161,602 | A | 7/1979 | Mueller |
| 4,949,386 | A | 8/1990 | Hill |
| 4,987,597 | A | 1/1991 | Haertl |
| 5,209,852 | A | 5/1993 | Sunaoka et al. |
| 5,294,401 | A | 3/1994 | Hagiwara |
| 5,387,473 | A | 2/1995 | Yoshimi et al. |
| 5,392,099 | A | 2/1995 | Kusumoto et al. |
| 5,828,012 | A | 10/1998 | Repolle et al. |
| 6,375,856 | B1 | 4/2002 | Seshimoto et al. |
| 6,512,834 | B1 | 1/2003 | Banter et al. |
| 6,743,273 | B2 | 6/2004 | Chung et al. |
| 6,913,736 | B2 | 7/2005 | Alvin et al. |
| 7,655,070 | B1 | 2/2010 | Dallas et al. |
| 7,717,975 | B2 | 5/2010 | Kalayci et al. |
| 9,317,068 | B2 * | 4/2016 | Sanders ................ G06F 1/1656 |
| 2005/0227610 | A1 * | 10/2005 | Zukor .................... F16K 24/04 454/339 |
| 2008/0248261 | A1 | 10/2008 | Bonnett et al. |
| 2009/0049988 | A1 * | 2/2009 | Meindl ................ B01D 53/228 95/285 |
| 2009/0090245 | A1 * | 4/2009 | Olszewski ......... B01D 46/0005 96/154 |
| 2009/0247970 | A1 | 10/2009 | Keleny et al. |
| 2009/0311618 | A1 | 12/2009 | Lee et al. |
| 2010/0288321 | A1 | 11/2010 | Dwyer |
| 2010/0307118 | A1 | 12/2010 | Kawano et al. |
| 2011/0097571 | A1 | 4/2011 | Tee et al. |
| 2011/0100547 | A1 | 5/2011 | Kelsey et al. |
| 2011/0143114 | A1 | 6/2011 | Horie et al. |
| 2012/0052266 | A1 | 3/2012 | Tee |
| 2012/0064273 | A1 | 3/2012 | Bacino |
| 2012/0186452 | A1 | 7/2012 | Smithies et al. |
| 2012/0204527 | A1 | 8/2012 | Chung et al. |
| 2013/0068687 | A1 | 3/2013 | Shenoy et al. |
| 2013/0186177 | A1 | 7/2013 | Palazzotto et al. |
| 2013/0229194 | A1 | 9/2013 | Palazzotto et al. |
| 2013/0237933 | A1 | 9/2013 | Ko |
| 2013/0271902 | A1 | 10/2013 | Lai et al. |
| 2013/0288103 | A1 | 10/2013 | Mizuno et al. |
| 2013/0330592 | A1 | 12/2013 | Mizuno et al. |
| 2014/0029782 | A1 | 1/2014 | Rayner |
| 2014/0033665 | A1 | 2/2014 | Smithies et al. |
| 2014/0044297 | A1 | 2/2014 | Loeppert et al. |
| 2014/0060330 | A1 | 3/2014 | Boyat et al. |
| 2014/0083296 | A1 | 3/2014 | Sanders |
| 2014/0230390 | A1 | 8/2014 | Shenoy et al. |
| 2015/0163572 | A1 | 6/2015 | Weiss et al. |

FOREIGN PATENT DOCUMENTS

| | | |
|---|---|---|
| JP | 2006231168 | 9/2006 |
| JP | 5329350 | 10/2013 |
| WO | 0103468 | 1/2001 |
| WO | 2013043987 | 3/2013 |
| WO | 2013044014 | 3/2013 |
| WO | 2014020812 | 2/2014 |
| WO | 2014047406 | 3/2014 |

OTHER PUBLICATIONS

"File History for U.S. Appl. No. 13/839,046", filed Mar. 15, 2013 and issued Apr. 19, 2016 ( pages).

"International Preliminary Report on Patentability," for PCT Application No. PCT/US2013/060852 dated Apr. 2, 2015 (13 pages).

"International Search Report and Written Opinion," for PCT/US2013/060852, dated Dec. 20, 2013 (16 pages).

"Third Office Action," for Chinese Patent Application No. 201380057195.7 dated Apr. 19, 2017 (24 pages) with English Translation.

"Fourth Office Action," for Chinese Patent Application No. 201380057195.7 dated May 17, 2018 (7 pages) with English Translation.

* cited by examiner

After Black Coating | Before Coating

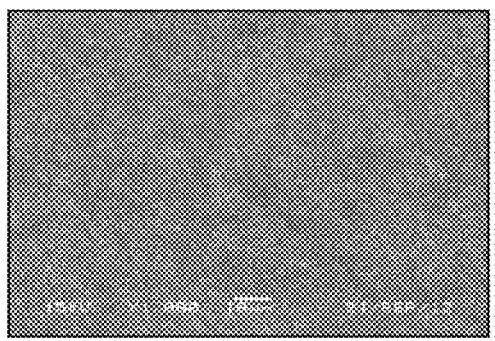
Image 13: SEM image of TX1325 after black coating on liner side (x1000)

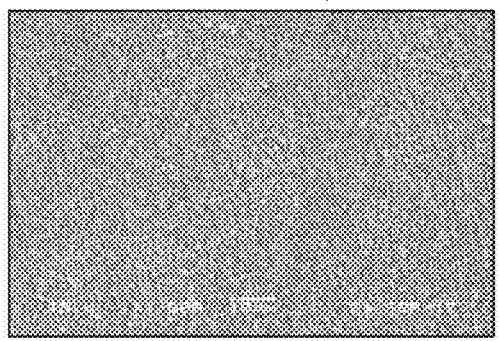
Image 21: SEM image of TX1325 support side (x1000)

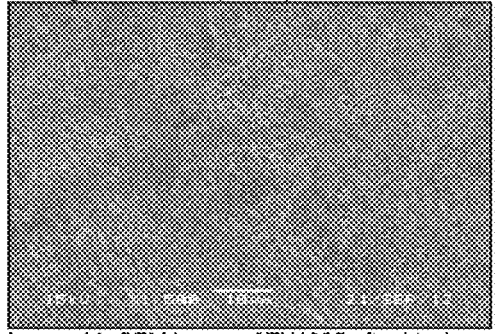
Image 14: SEM image of TX1325 after black coating on liner side (x1500)

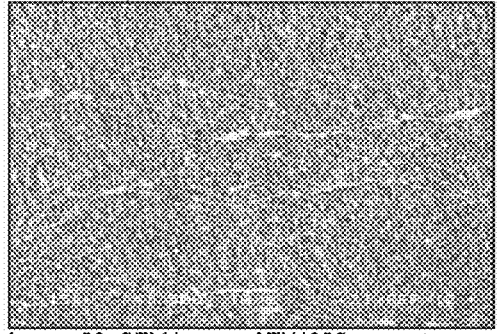
Image 22: SEM image of TX1325 support side (x1500)

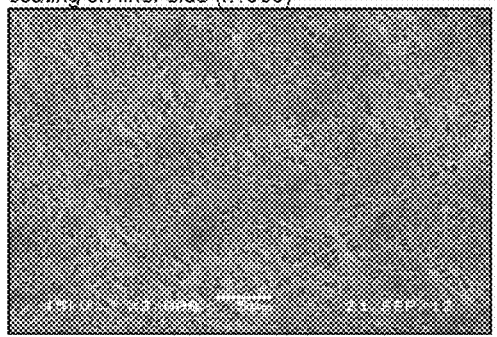
Image 15: SEM image of TX1325 after black coating on liner side (x3000)

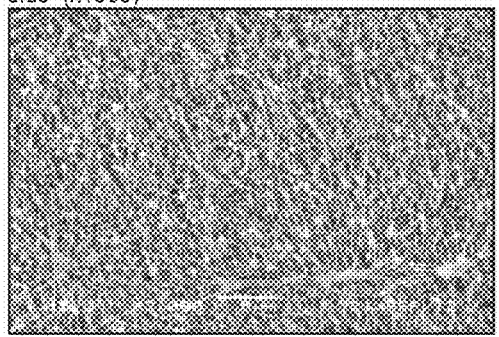
Image 23: SEM image of TX1325 support side (x3000)

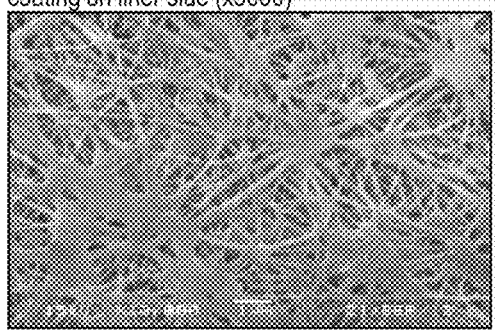
Image 16: SEM image of TX1325 after black coating on liner side (x10000)

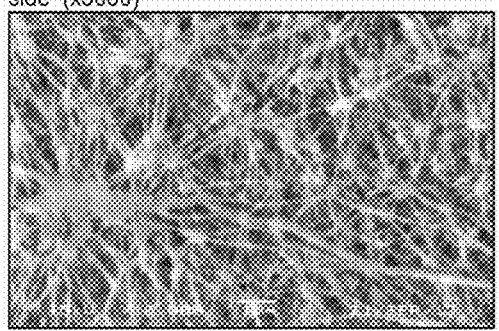
Image 24: SEM image of TX1325 support side (x10000)

FIG. 11

VENTING ASSEMBLY AND MICROPOROUS MEMBRANE COMPOSITE

This application is a continuation of U.S. application Ser. No. 13/839,046, filed Mar. 15, 2013, now U.S. Pat. No. 9,317,068, which is a non-provisional application claiming priority to U.S. Provisional Application No. 61/705,090, filed Sep. 24, 2012, and the entire contents of which is incorporated herein by reference.

FIELD OF THE INVENTION

The technology described herein generally relates to a composite. More particularly, the technology described herein relates to a microporous membrane composite used in a gas permeable venting assembly. More particularly, the technology relates to venting assemblies used to cover acoustic transducers.

BACKGROUND

For a variety of electronics, exposure to water is of concern due to water damage that can occur. For this reason, many companies are transitioning to product designs that are waterproof that offer oleophobicity and hydrophobicity. In doing so, such products also maintain clear acoustics for the microphones and speakers that are present in the device. Manufacturers would like to rate their products with a minimum of IPx7. This rating specifies that their products could survive being submerged to a depth of 1 meter for ½ hour without damage. A filter or vent is necessary for electronic devices to allow for pressure equalization, allowing the transducers to function properly.

Filters containing expanded polytetrafluoroethylene (ePTFE) are available to provide the necessary water protection for microphones and speakers. Acoustic vents are used to protect speakers and microphones from water and dust. Often these vents consist of expanded PTFE membranes. The PTFE membrane prevents water and/or dust from reaching the microphone or speaker, while also allowing the acoustic signal to pass through with minimal loss.

PTFE membranes are used because they can be manufactured to have low basis weight and high flexibility. These properties allow them to vibrate easily when excited by an acoustic signal, and transmit the acoustic signal to the other side without allowing liquid intrusion. In addition, PTFE membranes are gas permeable, allowing equalizations of differential pressures due to temperature changes, as well as the evacuation of moisture due to condensation. PTFE membrane also has high dust efficiency and can withstand high differential water pressure without any liquid water passing through.

Typically, such vents take the form of a disc being secured to the electronic housing covering a transducer. The industry has placed emphasis on achieving aesthetic goals such as filter color, while maintaining standards for acoustic performance, airflow and filtering ability. Additionally, conventional understanding dictates that an increase in basis weight and a decrease in flexibility of the PTFE membrane, such as through coating or laminating the PTFE, results in reduced acoustic performance of the vent. Such conventional understanding has been supported by transmission loss testing that has provided data demonstrating the decreased acoustic performance of such materials.

SUMMARY

The technology encompassed by the current disclosure generally relates to membrane composites that can be used in acoustic venting assemblies. In one embodiment of the technology disclosed herein, a venting media composite has a microporous membrane layer and a coating on the microporous membrane layer to form a composite. The basis weight of the composite is at least about 0.5% higher than a basis weight of the microporous membrane layer without the coating.

In another embodiment of the technology disclosed herein, a method of manufacturing venting media is disclosed. An expanded PTFE membrane is provided and a coating solution is formed. The membrane is coated with the coating solution to form a coating on the membrane. The basis weight of the venting media composite is at least about 0.5% higher than a basis weight of the microporous membrane layer without the coating, and the composite has an average insertion loss less than or equal to the average insertion loss of the microporous membrane layer without the composite in the frequency range from 300 Hz to 4000 Hz.

In yet another embodiment, another composite membrane is disclosed with a microporous membrane and a coating on the microporous membrane. The average transmission loss of the composite membrane is at least 40% more than the average transmission loss of the microporous membrane alone in the frequency range from 300 Hz to 4000 Hz, and the average insertion loss of the composite membrane is less than the average insertion loss of the microporous membrane is the frequency range from 300 Hz to 4000 Hz.

In yet another embodiment, a venting media composite is disclosed. The venting media has a microporous membrane layer and a coating on the microporous membrane layer, where the coating is a chromium-containing metal complex colorant.

BRIEF DESCRIPTION OF THE DRAWINGS

FIG. 11 depicts progressively-magnified SEM images of a second side of the first microporous membrane compared to the second side of the first coated microporous membrane of FIG. 10.

The invention may be more completely understood and appreciated in consideration of the following detailed description of various embodiments of the invention in connection with the accompanying drawings.

DETAILED DESCRIPTION

Figure 1:
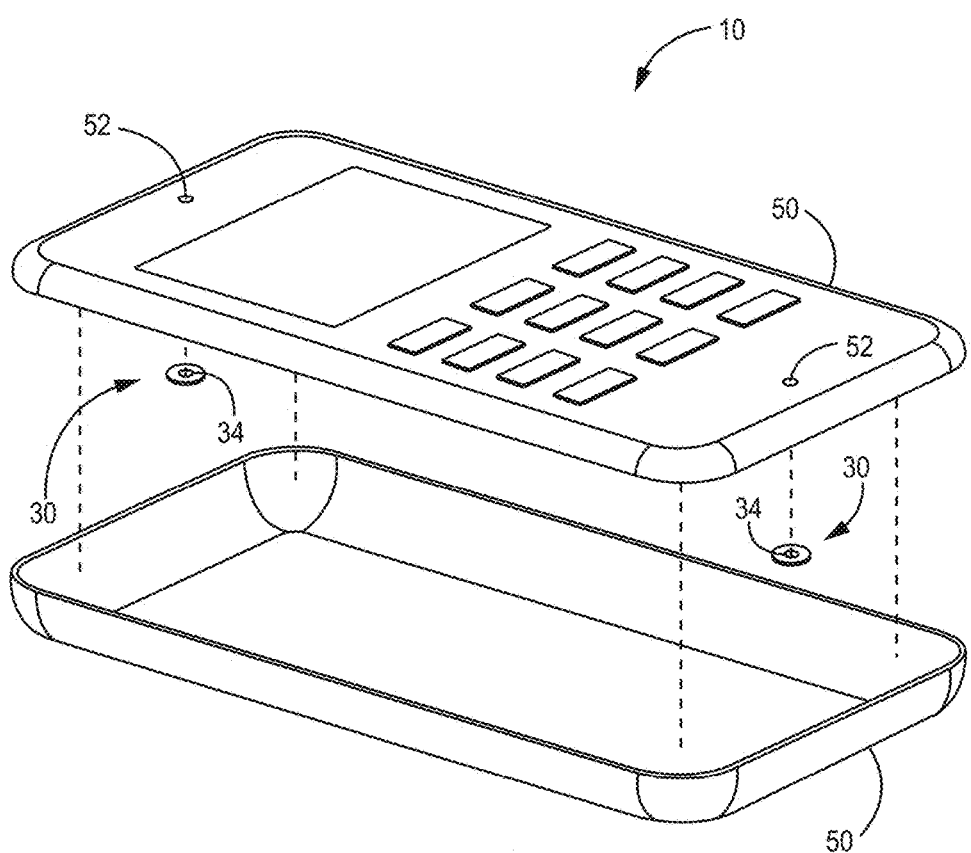
FIG. 1 depicts a schematic of an example implementation of the current technology.

FIG. 1 depicts a schematic of an example implementation of the current technology. An electronic assembly 10 has an enclosure 50 defining an opening 52 with an acoustic venting assembly 30 sealably disposed across the opening 52. The acoustic venting assembly 30 is generally configured to prevent entry of particulates and water to the opening 52 of the enclosure 50 and accommodate gas flow to allow equalization of pressure and acoustic pressure waves passing through. The filtering efficiency of the acoustic venting assembly 30 is generally no less than 99% with particle size greater than or equal to 0.3 micron traveling at 10.5 ft/min. In some embodiments, the electronic assembly 10 has an Ingress Protection Rating of at least IPx7 or IP67. The second number 7 in the IPx7 or IP67 rating indicates that ingress of water in harmful quantities shall not be possible when the enclosure is immersed in up to 1 meter of water for 30 minutes. Test procedures are further defined in an international standard published by the International Electrotechnical Commission (IEC) and referred to as international standard IEC 60529. The first digit x or 6 in the IPx7 or IP67 rating refers to the protection provided against the intrusion of solid objects and dust. The level of protection is unspecified when an "x" is used in place of a number. When the first digit is a 6, the level of protection provided is dust tight, indicating that there is no ingress of dust.

Figure 2:
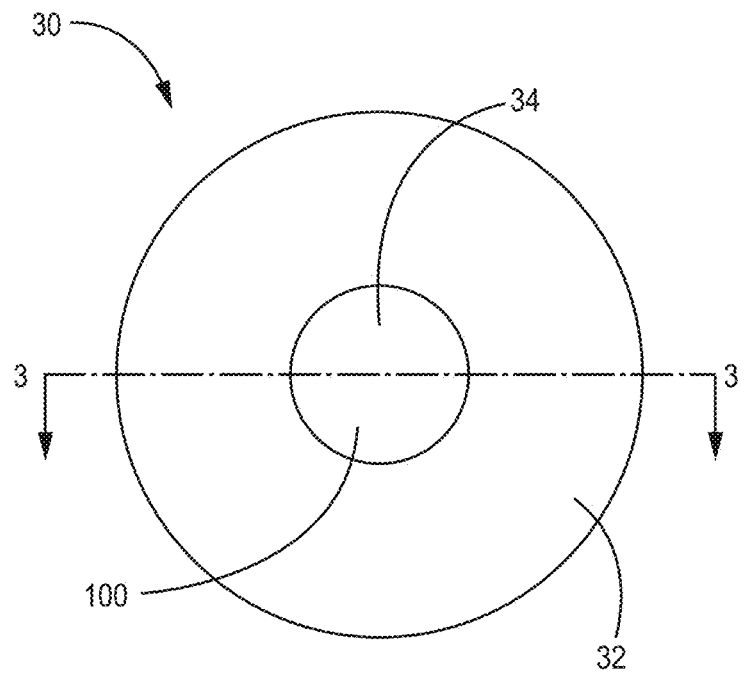
FIG. 2 is a front view of an example acoustic venting assembly of FIG. 1.
Figure 3:
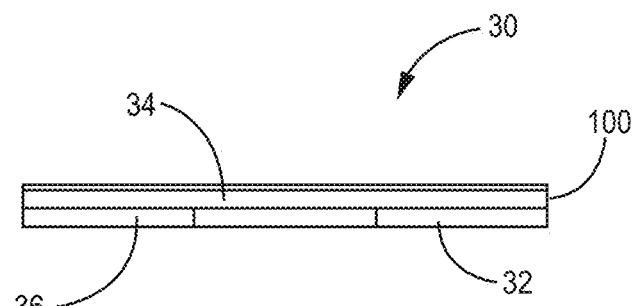
FIG. 3 is a cross-sectional view of the acoustic venting assembly of FIG. 2 along the line 3-3.

FIG. 2 depicts a front view of an example acoustic venting assembly consistent with the implementation depicted in FIG. 1, and FIG. 3 depicts a cross-sectional view of the acoustic venting assembly in FIG. 2. The acoustic venting assembly 30 generally defines a perimeter region 32 that is configured to couple to the electronics enclosure 50 about the opening 52 (See FIG. 1) and also defines an inner region 34 that allows sound transmission through a venting media composite 100. In FIGS. 2 and 3, the venting media composite 100 extends across the perimeter region 32 and the inner region 34. An adhesive 36 is disposed in the perimeter region 32, leaving the inner region 34 adhesive-free. The adhesive layer can be on one or both sides of the composite 100. The acoustic venting assembly 30 can include additional layers and combinations of layers such as foam layers, adhesive layers, and gasket layers, as is generally known in the art.

While FIGS. 1-3 depict the overall shape of the acoustic venting assembly 30 and the inner region 34 as circular, those having skill in the art will appreciate that the acoustic venting assembly and its inner region can have a variety of shapes that are consistent with the technology disclosed herein. For example, the acoustic venting assembly and/or its inner region could have an ovular shape or a rectangular shape. In at least one embodiment the acoustic venting assembly can define two inner regions.

Figure 4:
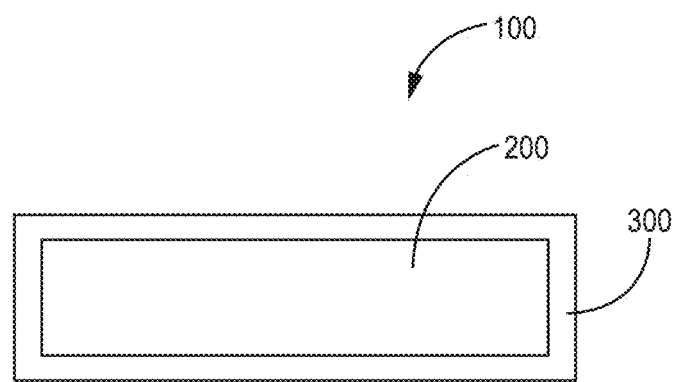
FIG. 4 depicts a schematic cross-sectional view of an acoustic venting composite consistent with the technology disclosed herein.

According to the current technology, the acoustic venting assembly 30 incorporates a venting media composite having a variety of structures, including those consistent with FIG. 4, for example. In some embodiments, the acoustic venting composite has an average insertion loss based on average H1 frequency response from about 0.1 dB to about 3 dB in the frequency range of 300 Hz to 4000 Hz. In at least one embodiment, the composite has an average insertion loss of less than 2 dB in the frequency range from 300 Hz to 4000 Hz. In many embodiments, the average insertion loss of the acoustic venting composite is equal to or less than the average insertion loss of the microporous membrane layer alone in the frequency range from 300 Hz to 4000 Hz. In some embodiments, the average insertion loss of the acoustic venting composite is not more than 85% of the average insertion loss of the microporous membrane layer alone in the frequency range from 300 Hz to 4000 Hz.

These particular embodiments where the composite or coated membrane has a lower average insertion loss than the uncoated membrane are surprising in light of the fact that in many embodiments, the coating adds weight and stiffness to the membrane. Conventional understanding dictates that an increase in basis weight and a decrease in flexibility of the membrane results in reduced acoustic performance of the vent. The expected reduced acoustic performance of composite membranes has typically been substantiated with results from transmission loss tests performed on the composite membrane when compared to the uncoated membrane.

Figure 14:
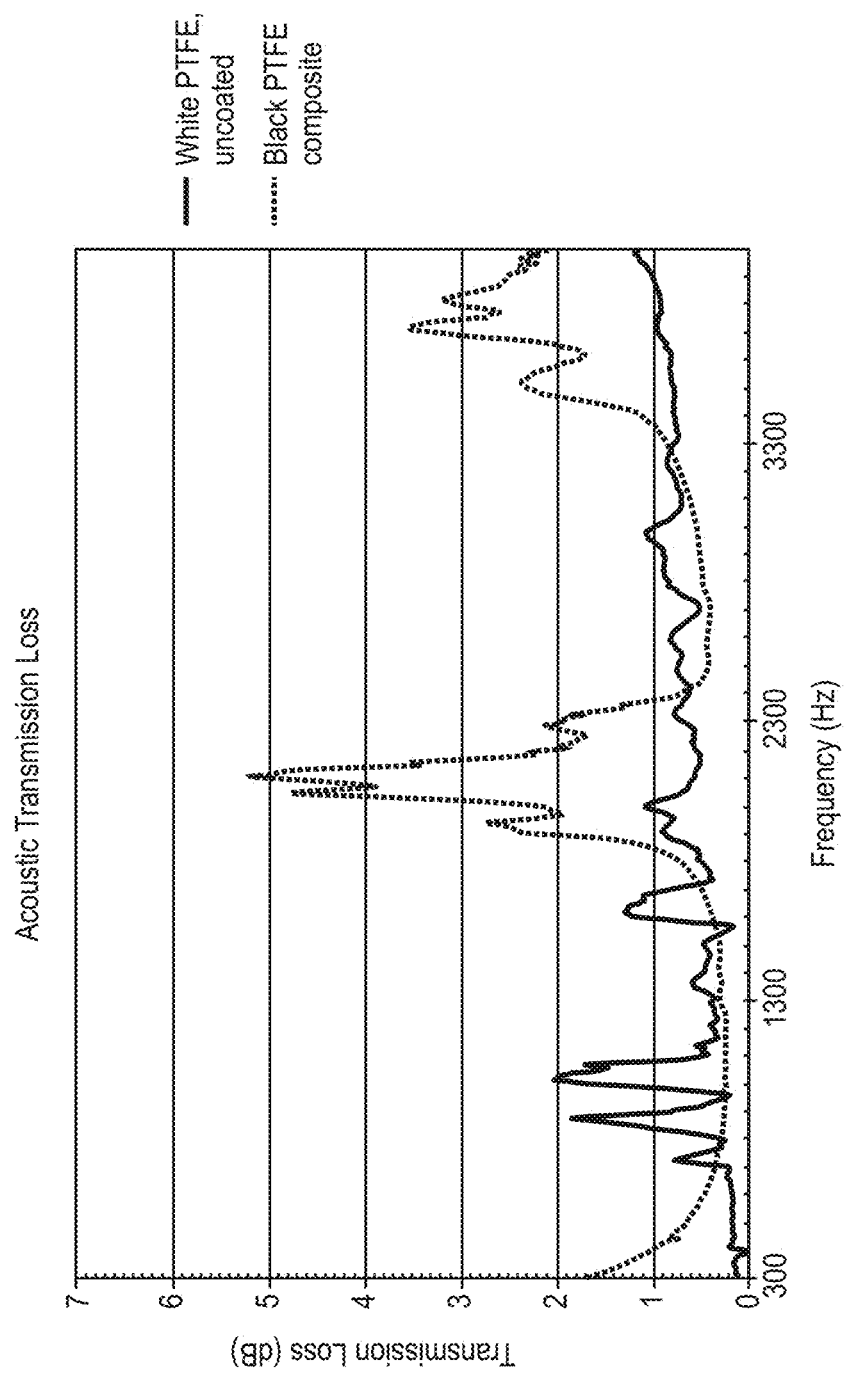
FIG. 14 is a graph showing and comparing the acoustic transmission loss of an uncoated PTFE membrane and a venting composite consistent with the technology disclosed herein.

Indeed, FIG. 14, which depicts a comparison of transmission loss data for a PTFE membrane alone (EN0701957) and a composite PTFE membrane consistent with the technology disclosed herein (prepared in accordance with Example 2, below), corroborates such expectations. Testing guidelines established by ASTM E2611-09 were used with 29 mm-diameter membrane samples mounted in a 29 mm tube. The PTFE-only membrane had an average transmission loss across the 300 Hz to 4000 Hz spectrum of about 0.69 dB, and the PTFE composite had an average transmission loss across the same spectrum of 1.11 dB. As such, the PTFE composite had an average transmission loss that was about 60% more than the average transmission loss of the PTFE alone. Further, as is visible in FIG. 14, the composite PTFE responds to various frequencies more erratically than its PTFE-only counterpart. The conventional understanding is also that much smaller membranes, such as those sized for installation in an electronics housing context as taught herein, will have a poorer performance that the larger component, where performance is indicated by the transmission loss data.

Contrary to conventional understanding, described above, some embodiments of the composite membrane disclosed herein demonstrate improved acoustic performance when compared to its membrane-only counterpart. In some embodiments of the current technology, the composite membrane can exhibit an average transmission loss that is at least 10% more, 20% more, 30% more, 40% more, or even 50% more than the average transmission loss of its membrane alone in the 300-4000 Hz frequency range. However, as discussed further herein, some embodiments of the composite membrane demonstrate not significantly worse or even improved acoustic performance as measured using different metrics, such as H1 frequency response measurement and insertion loss.

The average H1 frequency response measurement and insertion loss will now be described.

H1 Frequency Response and Insertion Loss

In general, frequency response is a quantitative measure of the output spectrum of a system or device in response to stimulus. It is a measure of the magnitude and phase of the output as a function of the frequency, in comparison to the input. In the context of an acoustic vent, the frequency response function (FRF) is a measure of the magnitude and phase of acoustic waves that have passed through the acoustic vent in comparison to the acoustic waves before they pass through the acoustic vent at each frequency across a particular acoustic range.

In one example of an experimental test for the H1 frequency response function of an acoustic-vent-of-interest, random acoustic signals, such as white noise, is generated via a loud speaker inside an anechoic test chamber. Two microphones are installed in the chamber to measure the acoustic signal, a reference microphone and an output microphone. Each of the microphones has a cap installed over the active area of the microphone, and the cap of the output microphone has the acoustic-vent-of-interest installed on the cap. The cap installed over the reference microphone lacks an acoustic vent. As such, the acoustic signals received through the reference microphone, which does not pass through any acoustic vent, is interpreted as equivalent to the acoustic signal prior to passing through the acoustic-vent-of-interest, and is accordingly designated the input data, or reference data, by the processing software. The acoustic signals received through the output microphone, which did pass through the acoustic-vent-of-interest, are designated as output data. The acoustic signals from the two microphones are then compared by the software to generate an H1 FRF across the spectrum.

Consistent with the experimental set up described above, one analysis system that can be used is the PULSE Analyzer Platform by Brüel & Kjær Sound & Vibration Measurement A/S located in Naerum, Denmark. The speaker is powered by the PULSE Analyzer Platform software to produce white noise. Brüel & Kær type 2670 microphones can be used with the PULSE Analyzer Platform to administer this test. The PULSE Analyzer Platform software records microphone data for 5 seconds and averages the result across the frequency range. Acoustic data from the reference microphone is compared to the acoustic data from the output microphone by the PULSE Analyzer Platform software using the H1 FRF (frequency response function) calculation method which provides an output value in decibels (dB) at intervals across a frequency range. The lower the frequency response is for an acoustic vent in decibels, the better the sound transmission through the vent.

Figure 16:
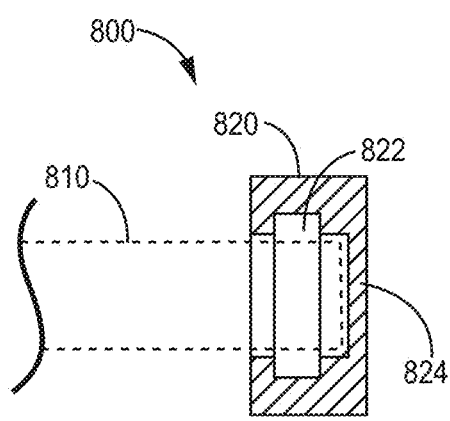
FIG. 16 depicts a cross-sectional view of a test cap consistent with experimental testing described herein.

FIG. 16 depicts a cross-sectional view of an example test cap 400, installed over a first microphone 410. An O-ring is disposed in an opening 422 defined by the cap 400, which creates a seal between the cap 400 and the microphone 410. Although not depicted in the current figure, an opening is machined in the axial center of the back wall 424 of the cap 400 to match the size and shape of the vent being tested, where the vent is installed similarly to how the vent would be installed over the opening defined by an electronics housing, as explained above in the discussion of FIG. 1. Generally, the machined opening will match the size and shape of the adhesive-free inner region portion of the acoustic-vent-of-interest, such as described above with respect to FIGS. 1-3, and the second test cap associated with the second microphone will have a substantially identical opening machined therein.

Figure 17:
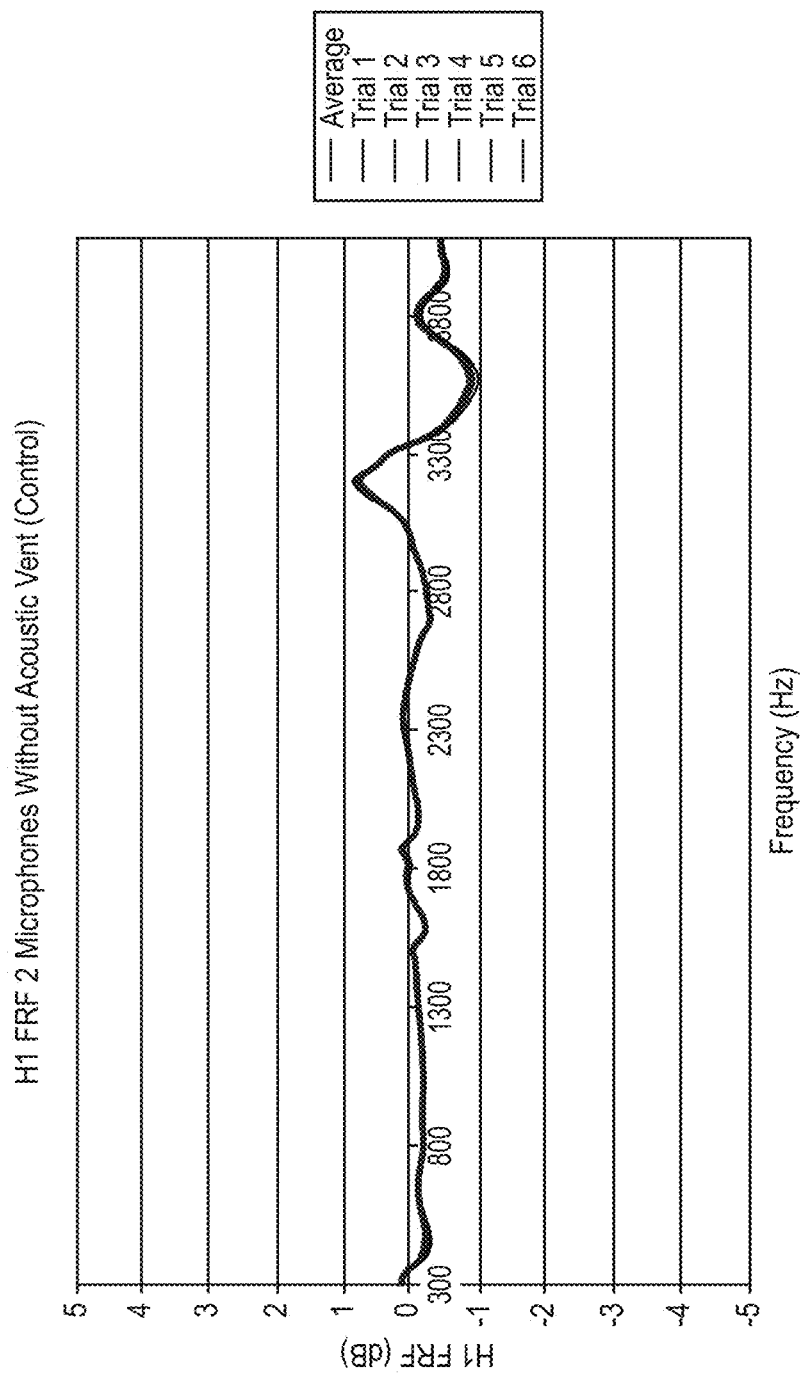
FIG. 17 is a graph depicting results for example control tests for frequency response.

The H1 FRF calculation primarily demonstrates a loss in acoustic signal that is attributed to the acoustic vent. However, a small portion of the loss in acoustic signal is due to equipment imperfections between the two microphones, their positioning, and the sound field generated by the speaker. As such, it can be desirable to also run a control test to generate the H1 FRF control curve. Such an FRF control test has a similar test set-up as described above with regard to testing an acoustic-vent-of-interest, except each cap associated with the reference microphone and the output microphone lack an acoustic vent. The H1 FRF calculation results are attributed to imperfections in the test setup. As such, in a perfect test, the H1 FRF will result in 0 dB across the spectrum. FIG. 17 depicts results associated with example control tests using the test equipment described above.

To calculate insertion loss, the control H1 FRF results adjust the test H1 FRF calculation results through the following equation:

$$IL(f) = H1_{vent}(f) - H1_{control}(f),$$

where IL(f) is the insertion loss; $H1_{vent}(f)$ is the H1 FRF for the acoustic-vent-of-interest; and $H1_{control}(f)$ is the H1 FRF for the control setup described above.

It will be appreciated by those having skill in the art that with a perfect, or near perfect, experimental setup the insertion loss will be numerically equivalent, or near equivalent, to the H1 FRF for an acoustic-vent-of-interest. But in practice, equipment quality can vary and therefore it is common to use insertion loss when determining the effect of a component on an acoustic signal. In this particular test procedure, the insertion loss is a comparison of FRF between microphones with and without an acoustic vent covering the output signal microphone.

As will be appreciated, the insertion loss results can be complex in nature. When attempting to compare the results of two different materials tested in an identical manner, it can be useful to calculate the average insertion loss in dB over a particular frequency range of interest. This is referred to as the average insertion loss. An equation for this calculation is given below:

$$IL_{avg} = \frac{1}{4000 - 300} \int_{300 \text{ Hz}}^{4000 \text{ Hz}} |IL(f)| \, df,$$

where |IL(f)| is the absolute value of the H1 frequency response function at a given frequency f, and the frequency range is from 300 Hz to 4000 Hz. The absolute value of the insertion loss is used in the above equation to avoid inappropriately deflating the average insertion loss value (suggesting improved performance) resulting from negative insertion loss values in the spectrum.

In some embodiments, a composite consistent with the technology disclosed herein has acoustics that are not significantly worse than the uncoated membrane. In some embodiments, the composite has an average insertion loss no more than 100% greater dB than that of the microporous membrane layer without the composite in the frequency range from 300 Hz to 4000 Hz. In some embodiments, the composite has an average insertion loss no more than 50% greater dB than that of the microporous membrane layer alone in the frequency range from 300 Hz to 4000 Hz. In some embodiments, the composite has an average insertion loss no more than 20% greater dB than that of the microporous membrane layer alone in the frequency range from 300 Hz to 4000 Hz.

In some embodiments, the composite has an average insertion loss in dB no more than that of the microporous membrane layer alone in the frequency range from 300 Hz to 4000 Hz. In this case, the acoustic performance of the coated membrane is no worse than the uncoated membrane.

In some embodiments, the composite has improved acoustic characteristics compared to the uncoated membrane. In some embodiments, the composite has an average insertion loss in dB of no more than 95%, 90%, 85%, or 80% of the microporous membrane layer alone in the frequency range from 300 Hz to 4000 Hz.

Figure 9:
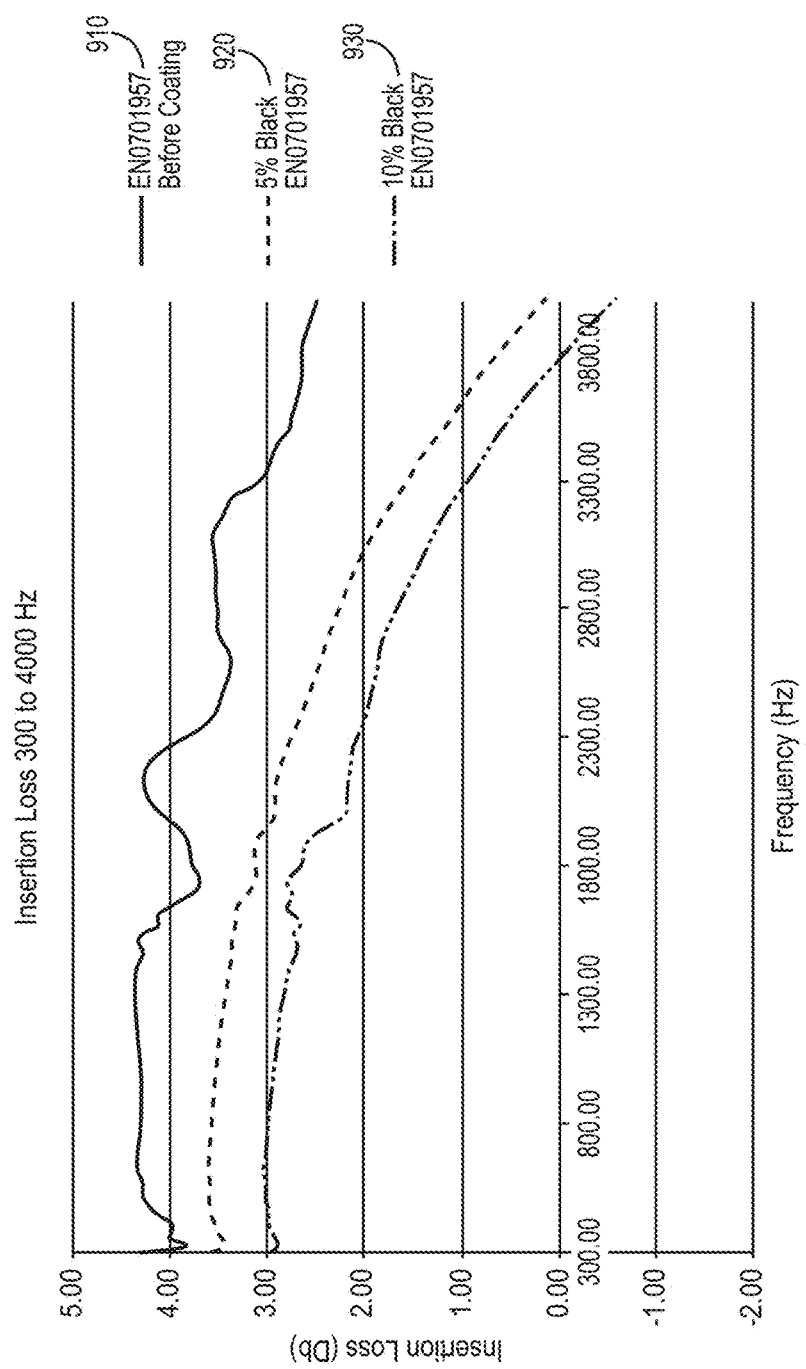
FIG. 9 is a graph showing the insertion loss of a microporous membrane and acoustic venting composites consistent with the technology disclosed herein.
Figure 10:
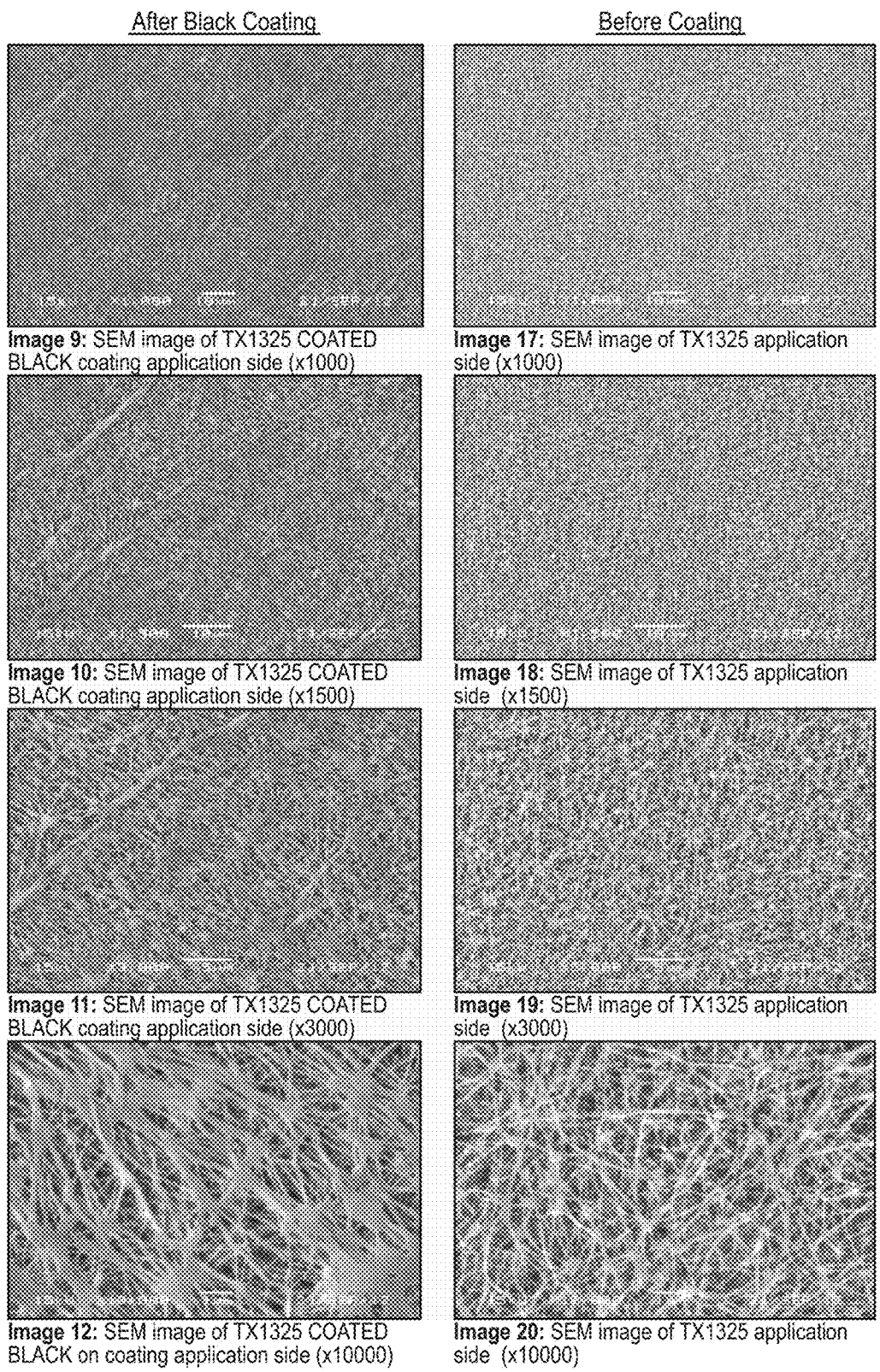
FIG. 10 depicts progressively-magnified SEM images of a first side of a first microporous membrane compared to a first side of a first coated microporous membrane consistent with the acoustic venting media disclosed herein.
Figure 12:
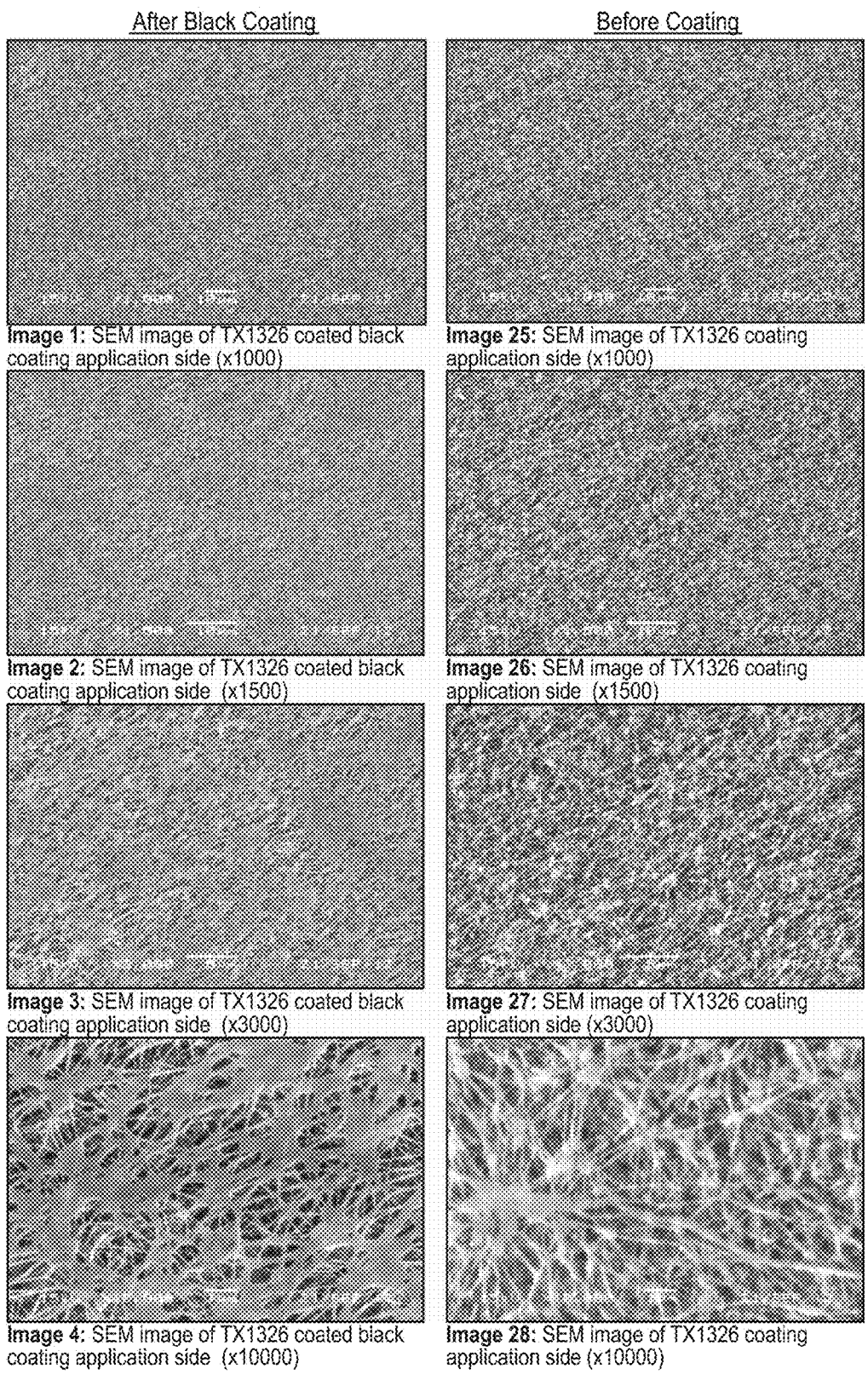
FIG. 12 depicts progressively-magnified SEM images of a first side of a second microporous membrane compared to a first side of a second coated microporous membrane consistent with the acoustic venting media disclosed herein.
Figure 13:
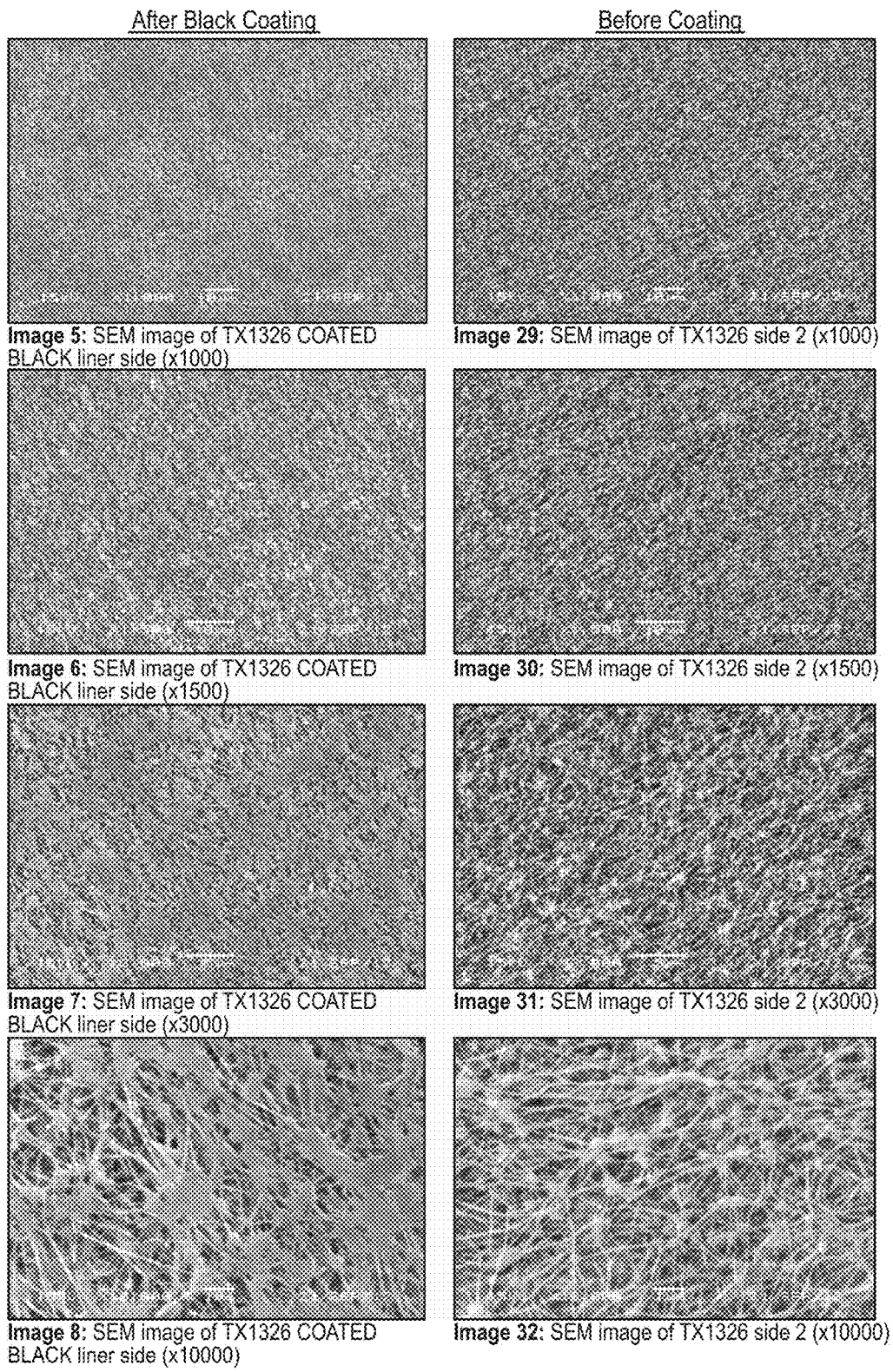
FIG. 13 depicts progressively-magnified SEM images of a second side of the second microporous membrane compared to a second side of the second coated microporous membrane of FIG. 12.

FIG. 9 is a graph comparing the insertion loss of a microporous membrane with acoustic venting composites consistent with the technology disclosed herein. The graph depicts the insertion loss from 300 Hz to 4000 Hz associated with ePTFE alone 910, the ePTFE coated with 5% coating solution 920, and the ePTFE coated with a 10% coating solution 930. Both of the coated ePTFE samples have a smoother insertion loss curve than the uncoated ePTFE sample. Large variations in the insertion loss curve sometimes indicate that the sound transmission will have a distorted quality. As a result, a smooth curve is preferred.

Table 1, below, shows the average insertion loss of the data associated with the samples depicted in FIG. 9, across the frequency range 300 to 4000 Hz.

TABLE 1

| Sample ID | Avg dB (300 to 4000 Hz) |
| --- | --- |
| EN0701957 Before Coating | 3.7 |
| 5% Black EN0701957 | 2.6 |
| 10% Black EN0701957 | 2.0 |

The uncoated ePTFE membrane which produced curve 910 in FIG. 9 is referred to herein and in other Figures as EN0701957, and has basis weight of 15.57 grams per square meter. The composite or coated membrane that produced curve 920 used EN0701957 as the base membrane, and was then coated with a coating solution containing 5% as Orcosolve Black RE-MC sold by Organic Dyestuffs Corporation of East Providence, R.I. dissolved in methyl ethyl ketone (MEK). The composite media that produced curve 930 used EN0701957 as the base membrane, and was then coated with a coating solution containing 10% as Orcosolve Black RE-MC sold by Organic Dyestuffs Corporation of East Providence, R.I. dissolved in methyl ethyl ketone (MEK). Further characteristics of each membrane or composite are provided in Table 2.

TABLE 2

| Membrane or Composite | Basis Weight (gsm) | Frazier Permeability (ft/min @ 0.5 in-H20) | Color | Summary of Acoustic Performance |
| --- | --- | --- | --- | --- |
| Uncoated EN0701957 (910) | 15.57 | 0.23 | White | Baseline Performance |

TABLE 2-continued

| Membrane or Composite | Basis Weight (gsm) | Frazier Permeability (ft/min @ 0.5 in-H20) | Color | Summary of Acoustic Performance |
| --- | --- | --- | --- | --- |
| 5% Coated EN0701957 (920) | 16.42 | 0.16 | Light Grey | Improved over uncoated EN0701957 |
| 10% Coated EN0701957 (920) | 17.66 | 0.13 | Dark Grey/Black | More than 5% improved over uncoated EN0701957 |

Membrane Having a Coating

Returning back to the figures, the venting media composite of the current application is generally a microporous membrane having a coating. The term composite is defined herein as the physical unification of two or more constituents (reinforcing elements, fillers, and composite matrix binder), which are distinguishable from each other at least on a macro scale. The constituents retain their identities, that is, they do not dissolve or merge completely into one another although they act in concert. Normally, each constituent and the interfaces between constituents are observable. One such example is depicted in FIG. 4, where a venting media composite 100 for use in an acoustic venting assembly 30 has a microporous membrane 200 and a coating 300 coating the microporous membrane 200. The term "coating" when used as a verb herein is defined as forming a substantially cohesive layer on an outer surface of a component, where the coating can penetrate the entire microporous membrane. The term "coating" when used as a noun herein is defined as a substantially cohesive layer disposed on an outer surface of the relevant component, where the layer can be disposed on the outer surface throughout the entire thickness of the membrane.

The microporous membrane 200 is expanded polytetrafluoroethylene (ePTFE) in a variety of embodiments, although in other embodiments a different material having pores with diameters of about 2 microns or less than 2 microns could be used. In one embodiment the microporous membrane layer has a thickness from about 10 microns to about 100 microns. In embodiments where ePTFE is used in the microporous membrane layer, the ePTFE has an average pore size between 0.001 and 0.8 microns. In a variety of embodiments, the ePTFE has a porosity of greater than 40% by volume. In some embodiments, the ePTFE has a porosity of greater than 50% by volume.

The coating 300 can be a variety of materials and combinations of materials. In one embodiment, the coating 300 comprises a colorant, where the term "colorant" as used herein is defined as any constituent that adjusts the perceived coloration of the component, such as inks, dyes, pigments, and the like. In a variety of embodiments, the coating 300 is a metal complex colorant. In at least one of those embodiments, the coating is a chromium (Cr)-containing metal complex colorant, such as Orcosolve Black RE-MC sold by Organic Dyestuffs Corporation of East Providence, R.I. Other colorants that may be useful include those described in U.S. Pub. No. 2009/0311618 and U.S. Pat. No. 5,387,473. In some embodiments, the coating 300 imparts a black coloration to the microporous membrane, while other coloration can also be imparted, such as blue, gray, dark blue, dark gray or other colors. In some embodiments, the coating 300 imparts a black coloration absent the use of carbon black. Those having skill in the art will appreciate that black colorants can actually be colors such as blue, red, or green, which are generally perceived as dark grey or black to the human eye after application.

In some embodiments, the coating can be a resin, a binder, a polymer, or two or more of these. In some embodiments such coatings exhibit improved acoustics and tensile strength without the addition of a colorant. Examples of polymeric materials and the polymer formation methods are described in the following patents and patent applications, the contents of which are hereby incorporated by reference in their entireties: U.S. Provisional Application No. 61/537,171, filed Sep. 21, 2011; U.S. Provisional Application 61/620,251, filed Apr. 4, 2012; U.S. Published Application No. 2012/0204527, filed Aug. 17, 2011; U.S. Pat. No. 7,717,975, issued on May 18, 2010; U.S. Pat. No. 7,655,070, issued Feb. 2, 2010; and U.S. Published Application No. 2009/0247970, filed Mar. 31, 2009.

In a variety of embodiments, the coating 300 increases the basis weight of the microporous membrane by at least about 0.5%, about 1%, about 3%, about 5%, about 10% and about 15%. The average insertion loss of the acoustic venting composite is generally less than the average insertion loss of its respective microporous membrane layer alone. In a variety of embodiments, such as the example depicted in Table 1, the average insertion loss of the acoustic venting composite is about 60-90% of the average insertion loss of the microporous membrane layer alone. In some of those embodiments, the average insertion loss of the acoustic venting composite is about 80% of the average insertion loss of the microporous membrane layer alone.

Permeability and Airflow

Generally, the coating 300 on the microporous membrane 200, reduces permeability of the acoustic venting composite 100 by about 50% when compared to the microporous membrane alone. In a variety of embodiments the coating 300 reduces the permeability of the acoustic venting composite by about 30% to about 70%, when compared to the microporous membrane 200 alone. In one embodiment, the pressure drop across the acoustic venting composite is less than about 10 mbar at 50 ccm for a 0.75 inch diameter flow path. In some embodiments, the pressure drop across the acoustic venting composite is less than about 8 mbar at 50 ccm for a 0.75 inch diameter flow path. In at least one embodiment, the pressure drop across the acoustic venting composite is less than 7 mbar at 50 ccm for a 0.75 inch diameter flow path.

In one embodiment, the composite has porosity of greater than 25%.

Figure 5:
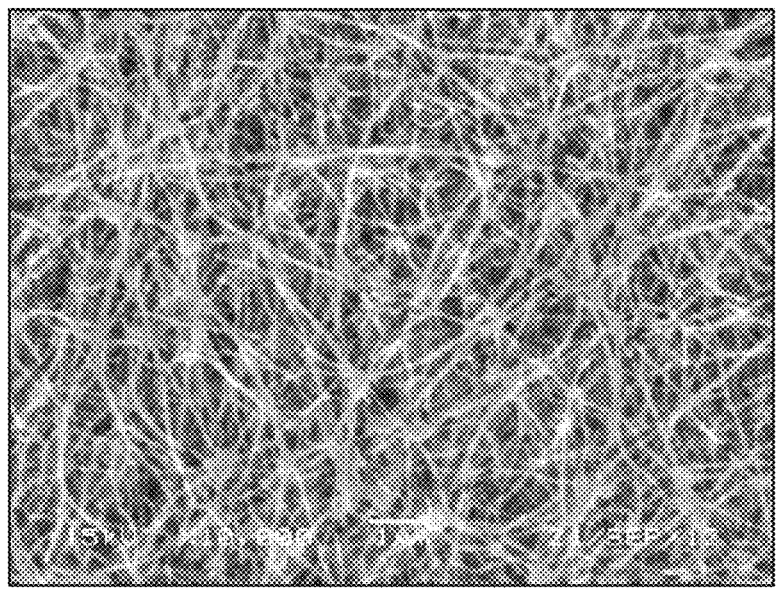
FIG. 5 depicts a Scanning Electron Microscope (SEM) image of a first side of a first microporous membrane.
Figure 6:
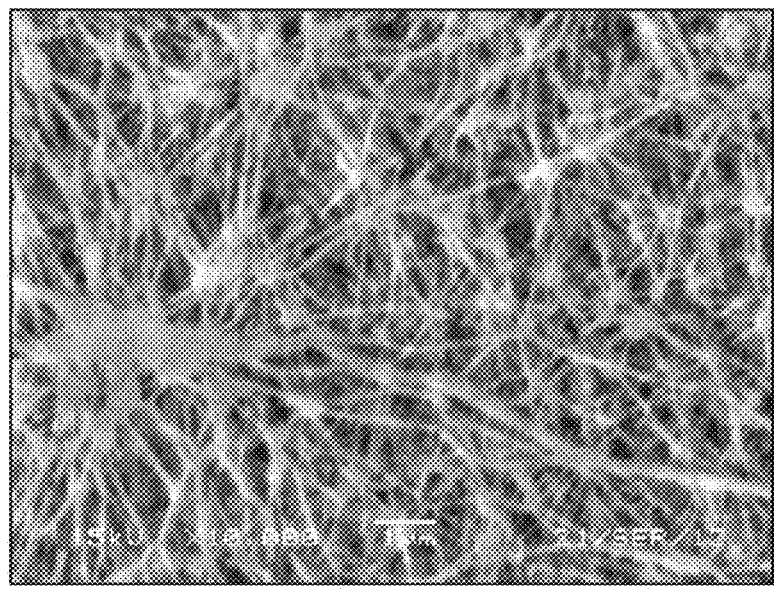
FIG. 6 depicts an SEM image of a second side of the first microporous membrane.
Figure 7:
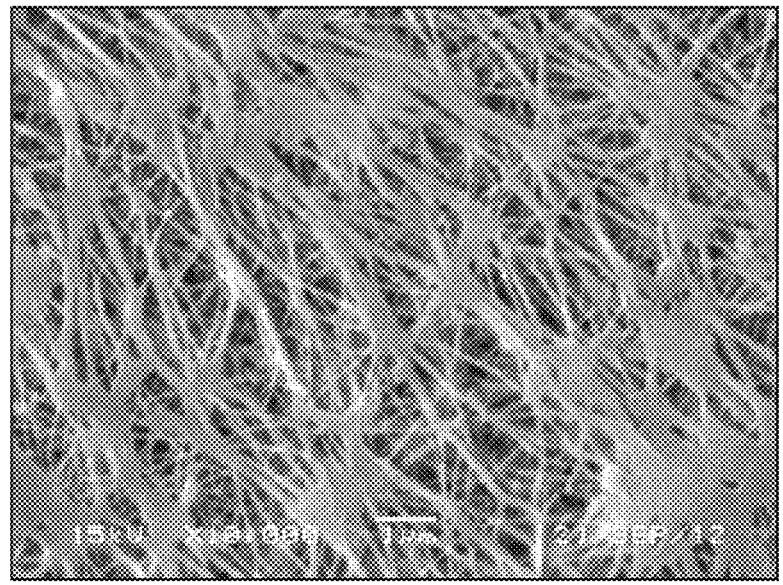
FIG. 7 depicts an SEM image of a first side of an acoustic venting composite consistent with the technology disclosed herein and made with the first microporous membrane of FIGS. 5 and 6.
Figure 8:
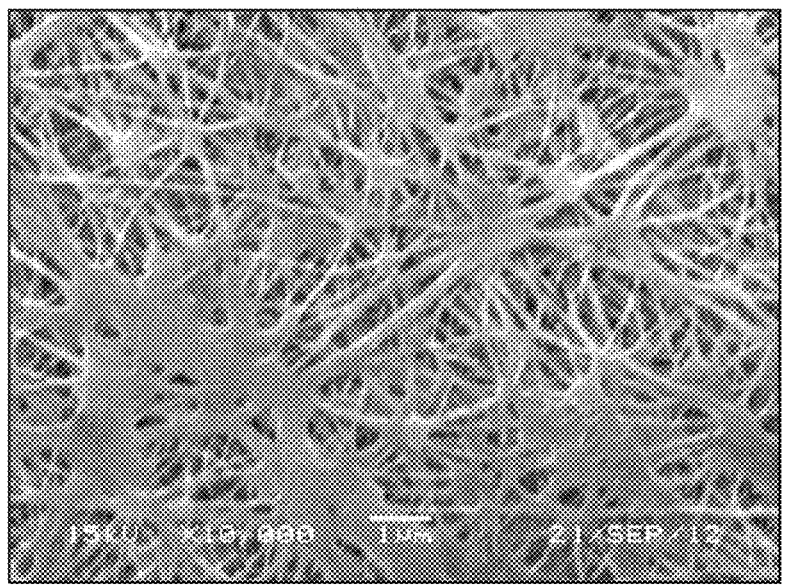
FIG. 8 depicts an SEM image of a second side of the acoustic venting composite of FIG. 7.

FIGS. 5-6 depict Scanning Electron Microscope (SEM) images of each side of a microporous membrane, and FIGS. 7-8 depict SEM images of each side of an acoustic venting composite consistent with the technology disclosed herein. The microporous membrane consistent with FIGS. 5-6 is coated with a $Cr^3$ metal complex colorant to arrive at an acoustic venting composite consistent with FIGS. 7-8.

FIGS. 10-13 each show progressively-magnified SEM images of one side of an ePTFE membrane before coating next to an ePTFE membrane after coating. The right column of each Figure depicts the ePTFE before coating and the left column depicts the ePTFE coating after coating. Generally, the coating appears to be particularly thick at nodes where the various fibrils of the ePTFE connect.

Tensile Strength

In various embodiments, a venting media composite, such as that consistent with FIG. 4, is expected to have a tensile strength of at least about 105%, 110%, 115%, 120%, 130%, 150%, 175% and 200% compared to the tensile strength of the microporous membrane alone.

Figure 18:
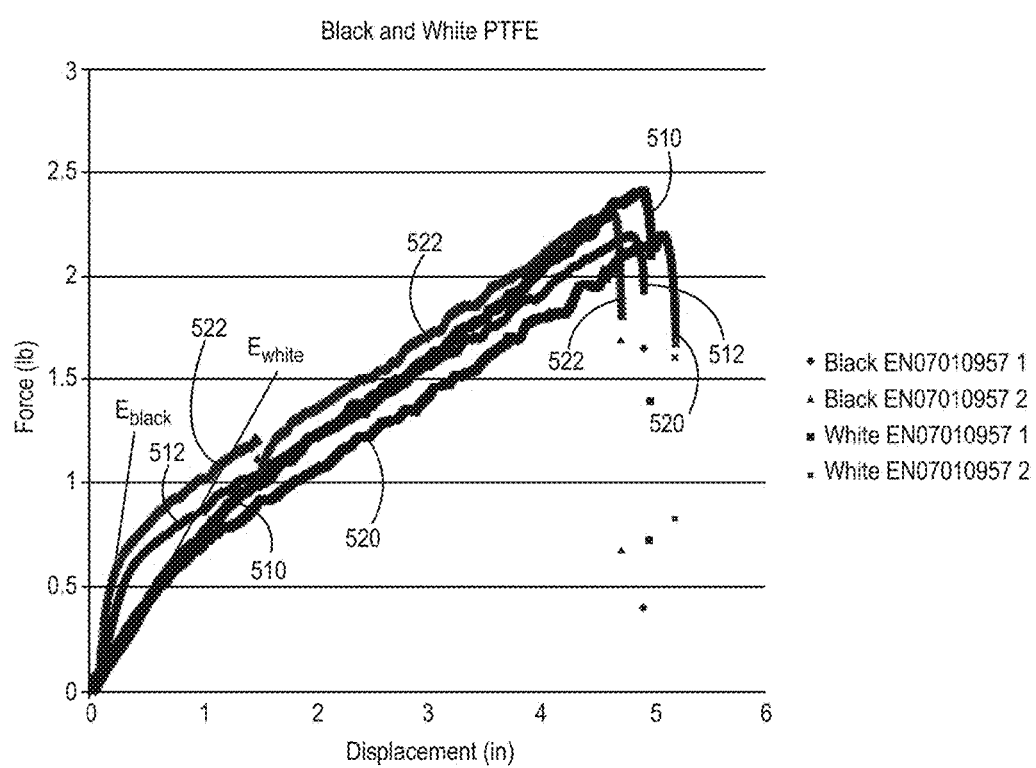
FIG. 18 is a graph depicting tensile test results for example membranes.

FIG. 18 depicts example results from tensile tests conducted on two sample white (uncoated) membranes 510, 520, and two sample black (composite) membranes 512, 522, that were prepared consistently with Example 2, discussed below. Each sample was 1 inch wide by 3 inches long. The test was run at 3 inches/minute, and was tested in the machine direction. The composite membranes demonstrated an increased Young's Modulus ($E_{black}$) compared to the uncoated membranes ($E_{white}$). The yield strength of the sample materials appears to remain the same before and after coating. The materials also appear to perform similarly during plastic deformation, which could be expected to the extent that plastic deformation relies on the movement of the structure of the base material.

Method

Now a method consistent with forming the acoustic venting composite will be described. A microporous membrane is provided and a coating solution is formed. In a variety of embodiments the microporous membrane has a removable liner disposed on one surface. The coating solution generally includes a solvent and a coating solid dissolved in the solvent. As described above, in at least one embodiment, the coating is a $Cr^3$ metal complex colorant, such as Orcosolve Black RE-MC sold by Organic Dyestuffs Corporation of East Providence, R.I. The solvent is generally chosen based on, among other factors, its ability to dissolve the coating. In one embodiment, the solvent is methyl ethyl ketone (MEK). In other embodiments, the solvent is acetone, ethyl alcohol or methanol. In one embodiment, the coating is dissolved in the solvent and the membrane is then dip coated using the coating solution. In one embodiment the coating process includes the removal of excess coating using a doctor blade, air knife, nip roller or a combination of these techniques. In one embodiment, the membrane is coated using a metered approach to coating, such as one of spray coating, curtain coating, gravure coating and lick rolling. In embodiments where one side of the membrane is submerged in the coating solution, the coating solution can travel across the thickness of the membrane, resulting in coating both sides of the membrane to create a composite. In at least one embodiment, one surface of the coated membrane can be placed in contact with a liner for drying, storage, and the like.

Three example membranes consistent with the technology disclosed herein will now be described:

EXAMPLE 1

A solution was prepared that consisted of Nylon PA66 terpolymer and Orcosolve RE-MC black chromium azo dye complex dissolved in ethanol. The solution consisted of 4% (by mass) PA66 terpolymer, 8% RE-MC dye, and ethanol. The solution was poured over Donaldson EN0701957 expanded PTFE membrane and the excess was wiped away. The membrane was allowed to dry resulting in evaporation of the ethanol. The resulting composite was placed in an oven at elevated temperature to facilitate cross-linking of the PA66 terpolymer around the PTFE fibers.

Figure 15:
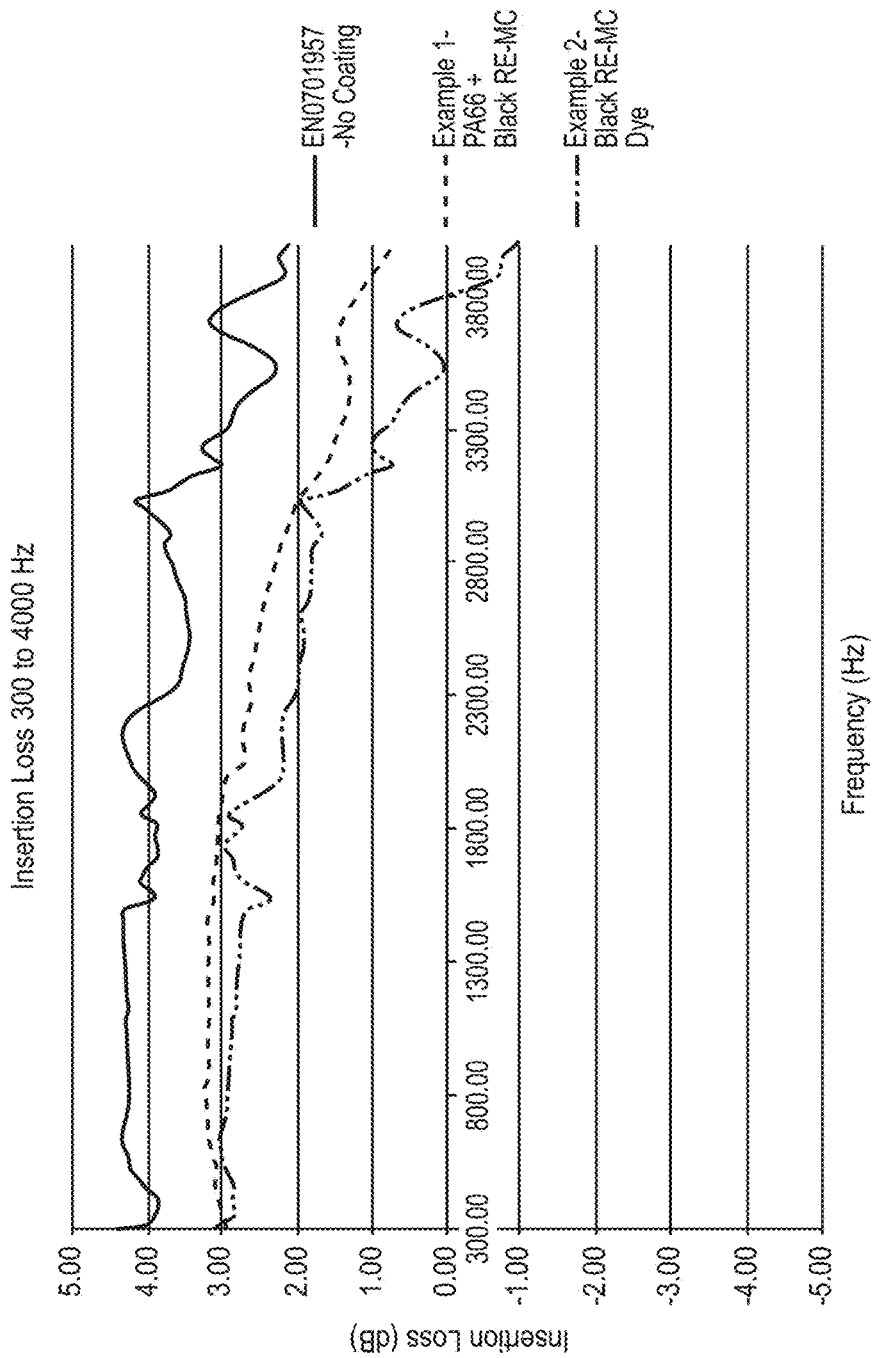
FIG. 15 is a graph showing the insertion loss of a microporous membrane and membrane composites consistent with the technology disclosed herein.

This material was measured to exhibit 50% reduction in air permeability compared with the expanded PTFE. The color was shown to be black or dark grey. Insertion loss was calculated via the H1 frequency response function and is shown in FIG. 15 as compared to the insertion loss of Example 2 (described below) and the PTFE membrane-only.

EXAMPLE 2

A solution was prepared that consisted of 8% (by mass) Orcosolve RE-MC black chromium azo dye complex dissolved in methyl ethyl ketone (MEK). The solution was poured over Donaldson EN0701957 expanded PTFE membrane and the excess was wiped away. The membrane was allowed to dry, which evaporated the MEK.

This material was measured to exhibit 50% reduction in air permeability compared with the expanded PTFE. The color was shown to be black or dark grey. Insertion loss was calculated via the H1 frequency response function and is shown in FIG. 15 as compared to the insertion loss of Example 1 and the PTFE membrane-only.

EXAMPLE 3

A solution was prepared that consisted of 10% (by mass) Lumiflon LF-916F fluoropolymer resin dissolved in methyl ethyl ketone (MEK). The solution was prepared with 10% Lumiflon LF-916F and the rest MEK. This solution was poured over Donaldson EN0701957 expanded PTFE membrane and the excess was wiped away. The MEK was allowed to dry out of the solution and PTFE. This material was measured to exhibit less than 50% reduction in air permeability compared with the expanded PTFE. Acoustic testing was not performed on this sample.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference. This application is intended to cover adaptations or variations of the present subject matter. It is to be understood that the above description is intended to be illustrative, and not restrictive.

I claimed:

1. A venting media composite comprising:
a microporous membrane layer; and
a coating on the microporous membrane layer, wherein the coating comprises a colorant and the colorant does not include carbon black, and the microporous membrane layer and the coating define the composite, wherein the composite has an average insertion loss based on average H1 frequency response from about 0.1 dB to about 3 dB in the frequency range of 300Hz to 4000 Hz.

2. The composite of claim 1, wherein a basis weight of the venting media composite is at least about 3% higher than a basis weight of the microporous membrane layer without the coating.

3. The composite of claim 1, wherein a basis weight of the venting media composite is at least about 5% higher than a basis weight of the microporous membrane layer without the coating.

4. The composite of claim 1, wherein a basis weight of the venting media composite is at least about 10% higher than a basis weight of the microporous membrane layer without the coating.

5. The composite of claim 1, wherein a basis weight of the venting media composite is at least about 15% higher than a basis weight of the microporous membrane layer without the coating.

6. The composite of claim 1, wherein the composite is configured to be coupled to an electronics enclosure about an opening defined in the electronics enclosure.

7. The composite of claim 1, further comprising an oleophobic coating.

8. The composite of claim 1, the microporous membrane layer comprising expanded polytetrafluoroethylene.

9. The composite of claim 8, wherein the expanded polytetrafluoroethylene has an average pore size between 0.001 and 2.0 microns.

10. The composite of claim 8, wherein the expanded polytetrafluoroethylene has a porosity of greater than 50%.

11. The composite of claim 1, wherein the composite has porosity of greater than 25%.

12. The composite of claim 1, wherein the colorant is black.

13. The composite of claim 1 having a filtering efficiency no less than 99.0% with particle size greater than or equal to 0.3 microns traveling at 10.5 ft/min.

14. The composite of claim 1 having a pressure drop of less than about 10 mbar at 50 ccm for a 0.75-inch diameter flow path.

15. The composite of claim 1 having a pressure drop of less than about 7 mbar at 50 ccm for a 0.75-inch diameter flow path.

16. The composite of claim 1 having a perimeter region and an inner region and an adhesive layer disposed in the perimeter region.

17. The composite of claim 1, wherein the coating comprises fluorochemicals.

18. The composite of claim 1, wherein the coating further comprises a metal complex colorant.

19. The composite of claim 1, wherein the coating further comprises a resin.

20. The composite of claim 1, wherein the coating further comprises an azo dye.

* * * * *